US012810116B2

(12) United States Patent
Meng

(10) Patent No.: US 12,810,116 B2
(45) Date of Patent: Nov. 24, 2026

(54) PAIRWISE INTERACTION DETECTION TOOL

(71) Applicant: FAIR ISAAC CORPORATION, Roseville, MN (US)

(72) Inventor: Liang Meng, San Rafael, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 572 days.

(21) Appl. No.: 18/349,736

(22) Filed: Jul. 10, 2023

(65) Prior Publication Data

US 2025/0021793 A1 Jan. 16, 2025

(51) Int. Cl.
*G06N 3/045* (2023.01)
*G06N 3/10* (2006.01)

(52) U.S. Cl.
CPC ............. *G06N 3/045* (2023.01); *G06N 3/105* (2013.01)

(58) Field of Classification Search
CPC ............................... G06N 3/045; G06N 3/105
See application file for complete search history.

(56) References Cited

U.S. PATENT DOCUMENTS

| | | | | |
|---|---|---|---|---|
| 7,451,065 | B2 * | 11/2008 | Pednault | G06V 10/7625 703/2 |
| 8,280,915 | B2 * | 10/2012 | Jagannath | G06F 18/24323 707/797 |
| 11,468,148 | B2 * | 10/2022 | Singapurwala | G06N 3/0499 |
| 2014/0160696 | A1 * | 6/2014 | Lee | G09G 3/20 361/749 |
| 2018/0357654 | A1 * | 12/2018 | Huang | G06Q 30/0206 |
| 2019/0205791 | A1 * | 7/2019 | Litherland | G06N 7/01 |
| 2021/0182690 | A1 * | 6/2021 | Jordan | G06N 3/082 |
| 2022/0366439 | A1 * | 11/2022 | Han | G06F 16/285 |

* cited by examiner

*Primary Examiner* — Khanh B Pham
(74) *Attorney, Agent, or Firm* — Mintz, Levin, Cohn, Ferris, Glovsky and Popeo, P.C.; F. Jason Far-hadian, Esq.

(57) ABSTRACT

A method is provided for implanting a pairwise interaction detection tool. The method includes binning input samples in a first dimension associated with a first predictor of an outcome based at least on a sample minimum, binning the input samples in a second dimension associated with a second predictor of the outcome, determining a two-dimensional risk pattern based at least on a first one-dimensional risk pattern associated with the first predictor along the first dimension and a second one-dimensional risk pattern associated with the second predictor along the second dimension, comparing a first divergence of a first machine learning model to a second divergence of a second machine learning model, and predicting a strength of an interaction effect between the first predictor and the second predictor based on the comparison. Related methods and articles of manufacture are also disclosed.

20 Claims, 11 Drawing Sheets

300

| X2 \ X1 | [-, 1) | [1, 2) | [2, 3) | [3, 6) | [6, 9) | [9, 12) | [12, 18) | [18, 24) | [24, 30) | [30, 36) | [36, 42) | [42, 48) | [48, 54) | [54, 60) | [60, +) | missing | Total |
|---|---|---|---|---|---|---|---|---|---|---|---|---|---|---|---|---|---|
| [-, 1) | $(G_{1,1}, B_{1,1})$ | | ... | ... | ... | ... | ... | ... | ... | ... | ... | ... | ... | $(G_{1,13}, B_{1,13})$ | | | $(G_{1,}, B_{1,})$ |
| [1, 3) | $(G_{2,1}, B_{2,1})$ | | ... | ... | ... | ... | ... | ... | ... | ... | ... | ... | ... | $(G_{2,13}, B_{2,13})$ | | | $(G_{2,}, B_{2,})$ |
| [3, 9) | $(G_{3,1}, B_{3,1})$ | | ... | ... | ... | ... | ... | ... | ... | ... | ... | ... | ... | $(G_{3,13}, B_{3,13})$ | | | $(G_{3,}, B_{3,})$ |
| [9, +) | $(G_{4,1}, B_{4,1})$ | | ... | ... | ... | ... | ... | ... | ... | ... | ... | ... | ... | $(G_{4,13}, B_{4,13})$ | | | $(G_{4,}, B_{4,})$ |
| missing | $(G_{5,1}, B_{5,1})$ | | | ... | | ... | | | ... | | ... | | | $(G_{5,6}, B_{5,6})$ | | | $(G_{5,}, B_{5,})$ |

G - count of goods

B - count of bads

FIG. 3

400

| X2 \ X1 | [-, 1) | [1, 2) | [2, 3) | [3, 6) | [6, 9) | [9, 12) | [12, 18) | [18, 24) | [24, 30) | [30, 36) | [36, 42) | [42, 48) | [48, 54) | [54, 60) | [60, +) | missing | Pattern Constraint |
|---|---|---|---|---|---|---|---|---|---|---|---|---|---|---|---|---|---|
| [-, 1) | | | > | > | > | < | < | < | < | < | < | < | < | < | | >0 | convex |
| [1, 3) | | | > | < | < | < | < | < | < | < | < | < | < | < | | >0 | convex |
| [3, 9) | | | < | < | < | < | < | < | < | < | < | < | < | < | | >0 | increasing |
| [9, +) | | | < | < | < | < | < | < | < | < | < | < | < | < | | <0 | increasing |
| missing | | | | < | | < | | | < | | < | | | < | | >0 | increasing |

FIG. 4

500

| X2 \ X1 | [-, 1) | [1, 2) | [2, 3) | [3, 6) | [6, 9) | [9, 12) | [12, 18) | [18, 24) | [24, 30) | [30, 36) | [36, 42) | [42, 48) | [48, 54) | [54, 60) | [60, +) | missing |
|---|---|---|---|---|---|---|---|---|---|---|---|---|---|---|---|---|
| [-, 1) | | | | | | | | | | | | | | | | |
| [1, 3) | ^ | | V | V | V | V | V | V | V | V | V | V | V | V | | V |
| [3, 9) | V | | V | V | V | V | V | V | V | V | V | V | V | V | | V |
| [9, +) | V | | V | V | V | V | V | V | V | V | V | V | V | V | | V |
| missing | <0 | | | <0 | | <0 | | | >0 | | >0 | | | >0 | | |
| Pattern Constraint | concave | | decreasing | decreasing | decreasing | decreasing | decreasing | decreasing | decreasing | decreasing | decreasing | decreasing | decreasing | decreasing | | decreasing |

FIG. 5

600

Step1 Model (Div=T 1.895,V 1.932)

| 601 var name | 602 pattern | MC 603 Train | MC 603 Validation |
|---|---|---|---|
| X2 | increasing | 1.725 | 1.751 |
| X1 | increasing | 0.269 | 0.291 |
| X3 | increasing | 0.081 | 0.079 |

FIG. 6A 605 607 609

Step2 Model

Cross Effects

| | | Train | | | | | | Validation | | | |
|---|---|---|---|---|---|---|---|---|---|---|---|
| x1_nm | x2_nm | div_base_T | optSt_main | optSt_cross | mc_main_T | mc_cross_T | mc_diff_T | div_base_V | mc_main_V | mc_cross_V | mc_diff_V |
| X1 | X2 | 1.895 | optimal | optimal | 0.000 | 0.117 | 0.117 | 1.932 | 0.000 | 0.130 | 0.130 |
| X1 | X3 | 1.895 | optimal | optimal | 0.000 | 0.001 | 0.001 | 1.932 | 0.000 | 0.001 | 0.001 |
| X2 | X1 | 1.895 | optimal | optimal | 0.000 | 0.111 | 0.111 | 1.932 | 0.000 | 0.124 | 0.124 |
| X2 | X3 | 1.895 | optimal | optimal | 0.000 | 0.001 | 0.001 | 1.932 | 0.000 | 0.000 | 0.000 |
| X3 | X1 | 1.895 | optimal | optimal | 0.000 | 0.001 | 0.001 | 1.932 | 0.000 | 0.001 | 0.001 |
| X3 | X2 | 1.895 | optimal | optimal | 0.000 | 0.001 | 0.001 | 1.932 | 0.000 | 0.000 | 0.000 |

FIG. 6B

610

Secondary Variable

Primary Variable

| Train | X1 | X2 | X3 | X4 | X5 | X6 | X7 | X8 | X9 | X10 | X11 | X12 | X13 | X14 | X15 | X16 |
|---|---|---|---|---|---|---|---|---|---|---|---|---|---|---|---|---|
| X1 | | 0.032 | 0.032 | 0.027 | 0.000 | 0.017 | 0.014 | 0.014 | 0.009 | 0.022 | 0.030 | 0.036 | 0.003 | 0.006 | 0.001 | 0.001 |
| X2 | 0.036 | | 0.000 | 0.001 | 0.009 | 0.011 | 0.001 | 0.013 | 0.002 | 0.001 | 0.005 | 0.001 | 0.000 | 0.000 | 0.010 | 0.001 |
| X3 | 0.034 | 0.000 | | 0.005 | 0.014 | 0.008 | 0.002 | 0.014 | 0.008 | 0.005 | 0.004 | 0.001 | 0.001 | 0.002 | 0.010 | 0.001 |
| X4 | 0.030 | 0.002 | 0.006 | | 0.019 | 0.004 | 0.006 | 0.005 | 0.011 | 0.001 | 0.003 | 0.007 | 0.000 | 0.001 | 0.004 | 0.000 |
| X5 | 0.001 | 0.011 | 0.016 | 0.020 | | 0.008 | 0.003 | 0.008 | 0.005 | 0.014 | 0.012 | 0.016 | 0.003 | 0.003 | 0.001 | 0.000 |
| X6 | 0.017 | 0.013 | 0.012 | 0.004 | 0.007 | | 0.002 | 0.005 | 0.004 | 0.003 | 0.012 | 0.013 | 0.000 | 0.004 | 0.003 | 0.000 |
| X7 | 0.019 | 0.004 | 0.003 | 0.008 | 0.002 | 0.002 | | 0.004 | 0.003 | 0.001 | 0.002 | 0.003 | 0.001 | 0.001 | 0.003 | 0.001 |
| X8 | 0.014 | 0.013 | 0.017 | 0.005 | 0.007 | 0.005 | 0.002 | | 0.005 | 0.004 | 0.010 | 0.015 | 0.001 | 0.001 | 0.003 | 0.001 |
| X9 | 0.014 | 0.004 | 0.004 | 0.001 | 0.007 | 0.005 | 0.002 | 0.008 | | 0.001 | 0.003 | 0.007 | 0.000 | 0.002 | 0.002 | 0.005 |
| X10 | 0.025 | 0.001 | 0.004 | 0.001 | 0.013 | 0.003 | 0.001 | 0.004 | 0.001 | | 0.004 | 0.004 | 0.000 | 0.000 | 0.004 | 0.000 |
| X11 | 0.029 | 0.006 | 0.003 | 0.002 | 0.011 | 0.009 | 0.001 | 0.007 | 0.004 | 0.003 | | 0.003 | 0.000 | 0.002 | 0.006 | 0.005 |
| X12 | 0.038 | 0.001 | 0.000 | 0.006 | 0.016 | 0.010 | 0.002 | 0.013 | 0.005 | 0.004 | 0.003 | | 0.001 | 0.002 | 0.011 | 0.006 |
| X13 | 0.006 | 0.001 | 0.002 | 0.000 | 0.003 | 0.001 | 0.002 | 0.003 | 0.007 | 0.001 | 0.001 | 0.001 | | 0.001 | 0.001 | 0.000 |
| X14 | 0.004 | 0.001 | 0.001 | 0.001 | 0.002 | 0.004 | 0.001 | 0.000 | 0.004 | 0.000 | 0.003 | 0.003 | 0.001 | | 0.001 | 0.000 |
| X15 | 0.002 | 0.010 | 0.011 | 0.004 | 0.000 | 0.003 | 0.002 | 0.004 | 0.001 | 0.004 | 0.008 | 0.012 | 0.001 | 0.002 | | 0.000 |
| X16 | 0.001 | 0.000 | 0.000 | 0.000 | 0.001 | 0.000 | 0.000 | 0.000 | 0.001 | 0.000 | 0.005 | 0.006 | 0.000 | 0.000 | 0.000 | |

FIG. 6C

620

621 622 623

| x1_nm | x2_nm | x2_segment_index | x2_segment | x1_pattern | pct_bad | pct_good | pct_total | Cross Effect |
|---|---|---|---|---|---|---|---|---|
| X3 | X1 | 0 | [-99000000.0, 2.0) | decreasing | 37.2% | 4.3% | 6.4% | 0.015 |
| X3 | X1 | 1 | [2.0, 9.0) | decreasing | 15.2% | 6.4% | 7.0% | 0.009 |
| X3 | X1 | 2 | [9.0, inf) | decreasing | 26.9% | 28.6% | 28.4% | 0.041 |
| X3 | X1 | 3 | missing | decreasing | 20.7% | 60.7% | 58.1% | 0.169 |
| X4 | X1 | 0 | [-99000000.0, 2.0) | increasing | 37.2% | 4.3% | 6.4% | 0.017 |
| X4 | X1 | 1 | [2.0, 9.0) | increasing | 15.2% | 6.4% | 7.0% | 0.008 |
| X4 | X1 | 2 | [9.0, inf) | increasing | 26.9% | 28.6% | 28.4% | 0.071 |
| X4 | X1 | 3 | missing | increasing | 20.7% | 60.7% | 58.1% | 0.159 |
| X12 | X1 | 0 | [-99000000.0, 2.0) | decreasing | 37.2% | 4.3% | 6.4% | 0.013 |
| X12 | X1 | 1 | [2.0, 9.0) | decreasing | 15.2% | 6.4% | 7.0% | 0.009 |
| X12 | X1 | 2 | [9.0, inf) | decreasing | 26.9% | 28.6% | 28.4% | 0.047 |
| X12 | X1 | 3 | missing | decreasing | 20.7% | 60.7% | 58.1% | 0.173 |
| X10 | X1 | 0 | [-99000000.0, 2.0) | decreasing | 37.2% | 4.3% | 6.4% | 0.010 |
| X10 | X1 | 1 | [2.0, 9.0) | decreasing | 15.2% | 6.4% | 7.0% | 0.007 |
| X10 | X1 | 2 | [9.0, inf) | decreasing | 26.9% | 28.6% | 28.4% | 0.034 |
| X10 | X1 | 3 | missing | decreasing | 20.7% | 60.7% | 58.1% | 0.114 |
| X2 | X1 | 0 | [-99000000.0, 2.0) | decreasing | 37.2% | 4.3% | 6.4% | 0.010 |
| X2 | X1 | 1 | [2.0, 9.0) | decreasing | 15.2% | 6.4% | 7.0% | 0.005 |
| X2 | X1 | 2 | [9.0, inf) | decreasing | 26.9% | 28.6% | 28.4% | 0.016 |
| X2 | X1 | 3 | missing | decreasing | 20.7% | 60.7% | 58.1% | 0.154 |
| X11 | X1 | 0 | [-99000000.0, 2.0) | decreasing | 37.2% | 4.3% | 6.4% | 0.010 |
| X11 | X1 | 1 | [2.0, 9.0) | decreasing | 15.2% | 6.4% | 7.0% | 0.007 |
| X11 | X1 | 2 | [9.0, inf) | decreasing | 26.9% | 28.6% | 28.4% | 0.039 |
| X11 | X1 | 3 | missing | decreasing | 20.7% | 60.7% | 58.1% | 0.135 |

FIG. 6D

630

633 632 631 634

| x1_nm | x2_nm | bin_idx | x2_binned_cross | x1_binned_cross | rawCnt_bad | rawCnt_good | pct_bad | pct_good | pct_total | WOE | score_main_avg | score_cross_avg | score_avg_diff |
|---|---|---|---|---|---|---|---|---|---|---|---|---|---|
| X1 | X2 | 0 | [0.0, 4.0) | [0.0, 2.0) | 2,423 | 523 | 4.9% | 1.0% | 2.9% | [illegible] | [illegible] | [illegible] | 0.350 |
| X1 | X2 | 1 | [0.0, 4.0) | [2.0, 3.0) | 2,438 | 510 | 4.9% | 1.0% | 2.9% | [illegible] | [illegible] | [illegible] | 0.248 |
| X1 | X2 | 2 | [0.0, 4.0) | [3.0, 4.0) | 2,488 | 567 | 5.0% | 1.1% | 3.1% | [illegible] | [illegible] | [illegible] | 0.141 |
| X1 | X2 | 3 | [0.0, 4.0) | [4.0, 5.0) | 2,434 | 614 | 4.9% | 1.2% | 3.0% | [illegible] | [illegible] | [illegible] | 0.048 |
| X1 | X2 | 4 | [0.0, 4.0) | [5.0, 6.0) | 2,399 | 611 | 4.9% | 1.2% | 3.0% | [illegible] | [illegible] | [illegible] | -0.046 |
| X1 | X2 | 5 | [0.0, 4.0) | [6.0, inf) | 11,449 | 3,494 | 23.2% | 6.9% | 14.9% | [illegible] | [illegible] | [illegible] | -0.217 |
| X1 | X2 | 6 | [4.0, 6.0) | [0.0, 2.0) | 1,530 | 512 | 3.1% | 1.0% | 2.0% | [illegible] | [illegible] | [illegible] | 0.343 |
| X1 | X2 | 7 | [4.0, 6.0) | [2.0, 3.0) | 1,429 | 528 | 2.9% | 1.0% | 2.0% | [illegible] | [illegible] | [illegible] | 0.244 |
| X1 | X2 | 8 | [4.0, 6.0) | [3.0, 4.0) | 1,456 | 604 | 3.0% | 1.2% | 2.1% | [illegible] | [illegible] | [illegible] | 0.134 |
| X1 | X2 | 9 | [4.0, 6.0) | [4.0, 5.0) | 1,359 | 553 | 2.8% | 1.1% | 1.9% | [illegible] | [illegible] | [illegible] | 0.041 |
| X1 | X2 | 10 | [4.0, 6.0) | [5.0, 6.0) | 1,365 | 594 | 2.8% | 1.2% | 2.0% | [illegible] | [illegible] | [illegible] | -0.060 |
| X1 | X2 | 11 | [4.0, 6.0) | [6.0, inf) | 6,911 | 3,268 | 14.0% | 6.4% | 10.2% | [illegible] | [illegible] | [illegible] | -0.226 |
| X1 | X2 | 12 | [6.0, 8.0) | [0.0, 2.0) | 1,119 | 796 | 2.3% | 1.6% | 1.9% | [illegible] | [illegible] | [illegible] | -0.654 |
| X1 | X2 | 13 | [6.0, 8.0) | [2.0, 3.0) | 1,049 | 992 | 2.1% | 2.0% | 2.0% | [illegible] | [illegible] | [illegible] | -0.684 |
| X1 | X2 | 14 | [6.0, 8.0) | [3.0, 4.0) | 878 | 1,177 | 1.8% | 2.3% | 2.1% | [illegible] | [illegible] | [illegible] | -0.440 |
| X1 | X2 | 15 | [6.0, 8.0) | [4.0, 5.0) | 709 | 1,314 | 1.4% | 2.6% | 2.0% | [illegible] | [illegible] | [illegible] | -0.209 |
| X1 | X2 | 16 | [6.0, 8.0) | [5.0, 6.0) | 549 | 1,417 | 1.1% | 2.8% | 2.0% | [illegible] | [illegible] | [illegible] | -0.003 |
| X1 | X2 | 17 | [6.0, 8.0) | [6.0, inf) | 1,285 | 8,618 | 2.6% | 17.0% | 9.9% | [illegible] | [illegible] | [illegible] | 0.495 |
| X1 | X2 | 18 | [8.0, inf) | [0.0, 2.0) | 1,452 | 1,653 | 2.9% | 3.3% | 3.1% | [illegible] | [illegible] | [illegible] | -0.639 |
| X1 | X2 | 19 | [8.0, inf) | [2.0, 3.0) | 1,116 | 1,842 | 2.3% | 3.6% | 3.0% | [illegible] | [illegible] | [illegible] | -0.352 |
| X1 | X2 | 20 | [8.0, inf) | [3.0, 4.0) | 952 | 2,075 | 1.9% | 4.1% | 3.0% | [illegible] | [illegible] | [illegible] | -0.238 |
| X1 | X2 | 21 | [8.0, inf) | [4.0, 5.0) | 739 | 2,246 | 1.5% | 4.4% | 3.0% | [illegible] | [illegible] | [illegible] | -0.062 |
| X1 | X2 | 22 | [8.0, inf) | [5.0, 6.0) | 541 | 2,500 | 1.1% | 4.9% | 3.0% | [illegible] | [illegible] | [illegible] | 0.149 |
| X1 | X2 | 23 | [8.0, inf) | [6.0, inf) | 1,221 | 13,701 | 2.5% | 27.0% | 14.9% | [illegible] | [illegible] | [illegible] | 0.305 |

FIG. 6E

640 score_avg_diff

| x1 \ x3 | [0.0, 5.0) | [5.0, 20.0) | [20.0, 35.0) | [35.0, 50.0) | [50.0, 60.0) | [60.0, 70.0) | [70.0, 80.0) | [80.0, 90.0) | [90.0, 100.0) | [100.0, inf) | missing |
|---|---|---|---|---|---|---|---|---|---|---|---|
| [0.0, 2.0) | -0.28 | -0.28 | -0.18 | -0.10 | -0.10 | -0.06 | -0.06 | -0.05 | -0.03 | 0.01 | -0.02 |
| [2.0, 9.0) | -0.21 | -0.21 | -0.12 | -0.05 | -0.05 | -0.01 | -0.01 | 0.01 | -0.04 | -0.06 | -0.07 |
| [9.0, inf) | -0.02 | -0.02 | 0.07 | 0.14 | 0.14 | 0.01 | 0.01 | -0.06 | -0.12 | -0.14 | -0.16 |
| missing | 0.09 | 0.10 | 0.14 | 0.06 | -0.13 | -0.11 | -0.36 | -0.41 | -0.80 | -0.80 | -0.48 |

FIG. 6F

PAIRWISE INTERACTION DETECTION TOOL

FIELD

The present disclosure generally relates to machine learning and more specifically to a pairwise interaction detection tool for machine learning models.

BACKGROUND

Machine learning models, such as neural networks, may be used in critical applications such as in the healthcare, manufacturing, transportation, financial, information technology industries, among others. In these and other applications, explanations to a user related to why the models generated a specific score or other outcome can be useful, and in some instances, required. For example, it can be useful for users to understand the predictors or other variables that have a greater impact on the output of the machine learning models. However, conventional systems are unable to detect and incorporate interactions between such predictors or other variables. As a result, conventional methods employing conventional models can provide inconsistent and unreliable explanations associated with the model output.

SUMMARY

Methods, systems, and articles of manufacture, including computer program products, are provided for implementation of a pairwise interaction detection tool. In one aspect, there is provided a system. The system may include at least one processor and at least one memory. The at least one memory may store instructions that result in operations when executed by the at least one processor. The operations may include: binning input samples in a first dimension associated with a first predictor of an outcome based at least on a sample minimum. The operations also include binning the input samples in a second dimension associated with a second predictor of the outcome based at least on binning the input samples in the first dimension. The operations also include determining a two-dimensional risk pattern based at least on a first one-dimensional risk pattern associated with the first predictor along the first dimension and a second one-dimensional risk pattern associated with the second predictor along the second dimension. The operations also include comparing a first divergence of a first machine learning model to a second divergence of a second machine learning model. The first machine learning model is trained to generate a first output based at least on the first predictor, the first one-dimensional risk pattern associated with the first predictor, the second predictor, the second one-dimensional risk pattern associated with the second predictor, and a baseline score generated based on the input samples. The second machine learning model is trained to generate a second output based at least on the baseline score and a cross-effect term including the two-dimensional risk pattern. The operations also include predicting a strength of an interaction effect between the first predictor and the second predictor based on the comparison. The strength of the interaction effect indicates a marginal contribution of the interaction between the first predictor and the second predictor to at least the second output.

In another aspect, there is provided a method. The method includes: binning input samples in a first dimension associated with a first predictor of an outcome based at least on a sample minimum. The method also includes binning the input samples in a second dimension associated with a second predictor of the outcome based at least on binning the input samples in the first dimension. The method also includes determining a two-dimensional risk pattern based at least on a first one-dimensional risk pattern associated with the first predictor along the first dimension and a second one-dimensional risk pattern associated with the second predictor along the second dimension. The method also includes comparing a first divergence of a first machine learning model to a second divergence of a second machine learning model. The first machine learning model is trained to generate a first output based at least on the first predictor, the first one-dimensional risk pattern associated with the first predictor, the second predictor, the second one-dimensional risk pattern associated with the second predictor, and a baseline score generated based on the input samples. The second machine learning model is trained to generate a second output based at least on the baseline score and a cross-effect term including the two-dimensional risk pattern. The method also includes predicting a strength of an interaction effect between the first predictor and the second predictor based on the comparison. The strength of the interaction effect indicates a marginal contribution of the interaction between the first predictor and the second predictor to at least the second output.

In another aspect, there is provided a computer program product including a non-transitory computer readable medium storing instructions. The operations include binning input samples in a first dimension associated with a first predictor of an outcome based at least on a sample minimum. The operations also include binning the input samples in a second dimension associated with a second predictor of the outcome based at least on binning the input samples in the first dimension. The operations also include determining a two-dimensional risk pattern based at least on a first one-dimensional risk pattern associated with the first predictor along the first dimension and a second one-dimensional risk pattern associated with the second predictor along the second dimension. The operations also include comparing a first divergence of a first machine learning model to a second divergence of a second machine learning model. The first machine learning model is trained to generate a first output based at least on the first predictor, the first one-dimensional risk pattern associated with the first predictor, the second predictor, the second one-dimensional risk pattern associated with the second predictor, and a baseline score generated based on the input samples. The second machine learning model is trained to generate a second output based at least on the baseline score and a cross-effect term including the two-dimensional risk pattern. The operations also include predicting a strength of an interaction effect between the first predictor and the second predictor based on the comparison. The strength of the interaction effect indicates a marginal contribution of the interaction between the first predictor and the second predictor to at least the second output.

In some variations, one or more features disclosed herein including the following features can optionally be included in any feasible combination of the system, method, and/or non-transitory computer readable medium.

In some variations, a visualization is generated representing the strength of a plurality of interaction effects between a plurality of predictors. The strength of the plurality of interaction effects includes the strength of the interaction effect between the first predictor and the second predictor. The plurality of predictors includes the first predictor and the second predictor.

In some variations, the visualization includes at least one of a graph, a heat map, a tabulation, and a matrix.

In some variations, the visualization includes a ranking of strength of the plurality of interaction effects.

In some variations, the sample minimum indicates a minimum quantity of samples associated with a corresponding label that are included in each bin in the first dimension, and the input samples are binned in the first dimension such that each bin in the first dimension includes a quantity of samples associated with the corresponding label that is greater than or equal to the minimum quantity.

In some variations, the input samples are binned in the second dimension according to bin breaks separating each bin determined during binning the input samples in the first dimension.

In some variations, the first one-dimensional risk pattern includes at least one of increasing, decreasing, concave, and convex, and the second one-dimensional risk pattern includes at least one of increasing, decreasing, concave, and convex.

In some variations, the first one-dimensional risk pattern and the second one-dimensional risk pattern are applied as separate constraints on the first machine learning model, and the two-dimensional risk pattern is applied as a single constraint on the second machine learning model.

In some variations, the two-dimensional risk pattern represents the first one-dimensional risk pattern and the second one-dimensional risk pattern of a bin at an intersection between the first predictor and the second predictor.

In some variations, the first machine learning model is at least one of a neural network, a generalized additive model, and a scorecard model, and the second machine learning model is a neural network, a generalized additive model, and a scorecard model.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a pairwise interaction detection tool for, for example, use in machine learning, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts an example table showing two-dimensional binning, consistent with implementations of the current subject matter;

FIG. 4 depicts an example table showing pattern detection for one predictor, consistent with implementations of the current subject matter;

FIG. 5 depicts an example table showing pattern detection for the other predictor, consistent with implementations of the current subject matter;

FIGS. 6A-6F illustrate various example visualizations generated using an example pairwise interaction detection system, consistent with implementations of the current subject matter.

Figure 1:
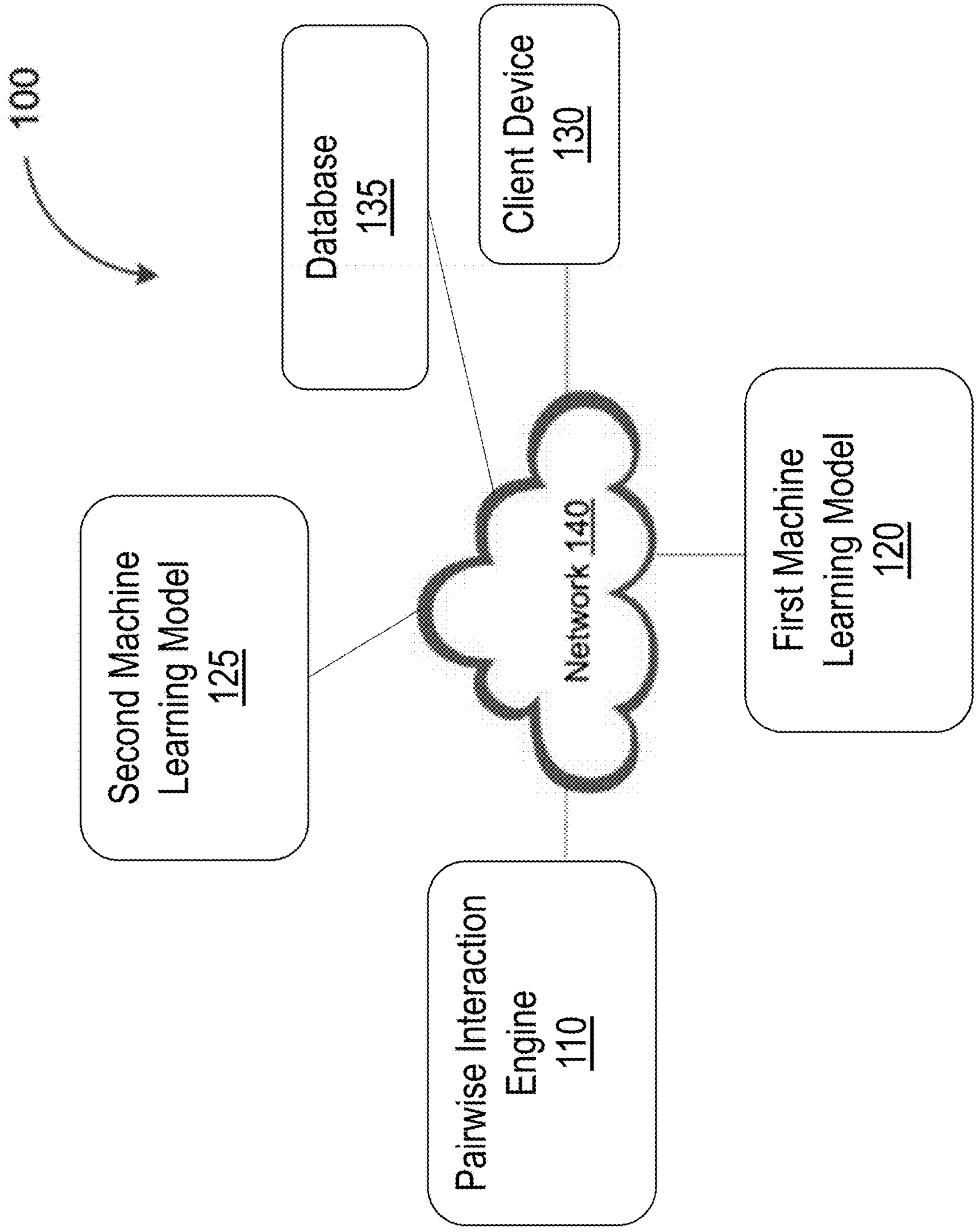
FIG. 1 depicts an example pairwise interaction detection system, consistent with implementations of the current subject matter.

When practical, like labels are used to refer to same or similar items in the drawings.

DETAILED DESCRIPTION

With the evolution of new products, such as in the healthcare, manufacturing, transportation, financial (e.g., banking, lending, credit), and information technology industries, limited access to high-quality data with high binary class coverage (e.g., "good" and "bad" labels in transactional domains) can lead to challenges in building "responsible" supervised models (e.g., neural networks) for solving certain classification problems. Explainable machine learning models provide users with explanations regarding the predictions and outputs generated by the machine learning models.

Systems have been developed to empower users to interactively develop explainable models. However, current models are generally built based on one-dimensional predictors and are unable to detect and incorporate interactions between predictors. In other words, these models are unable to quantify marginal contributions for interaction effects between multiple predictors. Further, such models are generally unable to detect and apply pattern constraints, causing unexplainable or misleading evaluations on the marginal contribution of predictors.

Segmentation Ensemble Models (SEMs) can search and build optimal multi-scorecard systems to incorporate strong interaction effects within input data. But, SEMs generally cannot present a clear structure of interactions. SEMs also generally fail to perform effective score engineering to ensure explainable score movement across segments, especially in presence of highly correlated predictors. Additionally, more sophisticated conventional machine learning models may better capture complicated intercorrelation structures of the data, but like SEMs such conventional models fail to provide extensive score engineering during model training and cannot effectively present where and how interactions take place, even after model training.

Consistent with implementations of the current subject matter, the pairwise interaction detection tool intelligently detect interaction effects between any two predictors in an input pool of predictors (e.g., input data) and allow users to incorporate interaction effects into scorecard models, improving the scorecard building process. For example, the pairwise interaction detection tool described herein discovers and applies pattern constraints in both a one-way (e.g., in one dimension) and two-way (e.g., in two dimensions) fashion to secure model explainability.

The pairwise interaction detection tool constructs and evaluates pairwise interaction effects on margin to any existing model score as part using a metric, such as a marginal contribution to divergence metric, to rank interaction effects of predictor pairs. For example, in some implementations described herein, for each pair of input predictors the pairwise interaction detection tool builds two scorecard models with pattern constraints, and the performance difference of these two models implies the strength of the interaction effect. A first model is intended to capture the main effects of two predictors, which includes at least (or only) three terms: the existing model score and two predictors as separate standalone components. The second model may be built on top of the first model by adding in a fourth term: a cross term of the two predictors. With respect to the cross term, the pairwise interaction detection tool performs a count-driven re-binning based on two predictors to ensure there are adequate samples at each two-way bin and to avoid or limit potential low-count issues when simply crossing two pre-binned predictors. Then, the pairwise interaction detection tool can automatically detect either one-way or two-way risk patterns and apply the risk patterns as pattern constraints of the scorecard models to improve model explainability.

The pairwise interaction detection tool may additionally and/or alternatively validate trained interaction effects over any user-specified test data sample to perceive the robustness of pairwise interaction effects. The tool may further generate one or more visualizations to allow users to understand the structure of pairwise interaction effects and the strength of such interaction effects. As a result, the pairwise interaction detection tool described herein may allow users to iteratively promote interaction effects depending on their marginal contributions to the resulting score predicted by the models.

Consistent with implementations of the current subject matter, the pairwise interaction detection tool performs two-dimensional binning of samples as well as a two-dimensional risk pattern detection and applies the binning and risk pattern constraints to input samples for each pair of predictors. The tool also determines a marginal contribution of the interaction effects to a baseline score generated by an existing model. For example, the pairwise interaction detection tool bins input samples in a first dimension associated with a first predictor of an outcome based at least on a sample minimum and for each resulted bin of the first predictor further bins the input samples in a second dimension associated with a second predictor of the outcome based at least on a sample minimum. The tool also determines a two-dimensional risk pattern based at least on a first one-dimensional risk pattern associated with the first predictor along the first dimension and a second one-dimensional risk pattern associated with the second predictor along the second dimension.

As noted, the tool may compare the divergence of a first machine learning model to the divergence of a second machine learning model. The first machine learning model may be trained to generate a first output based at least on the first predictor, the first one-dimensional risk pattern associated with the first predictor, the second predictor, the second one-dimensional risk pattern associated with the second predictor, and a baseline score of an existing model (e.g., a machine learning model, a scorecard model, etc.). The second machine learning model is trained to generate a second output based at least on all terms of the first machine learning model and a cross-effect term with the determined two-dimensional risk pattern constraints. Additionally and/or alternatively, the tool predicts a strength of an interaction effect between the first predictor and the second predictor based on the comparison. Here, the strength of the interaction effect measures a marginal contribution of the interaction between the first predictor and the second predictor to the first model output. Accordingly, the pairwise interaction detection tool described herein can provide marginal contributions for all predictor pairs of interest with proper pattern constraints applied to ensure model explainability.

FIG. 1 depicts a system diagram illustrating an example of a pairwise interaction detection tool or system 100, consistent with implementations of the current subject matter. Referring to FIG. 1, the pairwise interaction detection tool 100 may include a pairwise interaction engine 110, a first machine learning model 120, a second machine learning model 125, a database 135, and a client device 130. The pairwise interaction engine 110, the first machine learning model 120, the second machine learning model 125, the database 135, and the client device 130 may be communicatively coupled via a network 140. The network 140 may be a wired network and/or a wireless network including, for example, a wide area network (WAN), a local area network (LAN), a virtual local area network (VLAN), a public land mobile network (PLMN), the Internet, and/or the like. In some implementations, the pairwise interaction engine 110, the first machine learning model 120, the second machine learning model 125, the database 135, and/or the client device 130 may be contained within and/or operate on a same device. It should be appreciated that the client device 130 may be a processor-based device including, for example, a smartphone, a tablet computer, a wearable apparatus, a virtual assistant, an Internet-of-Things (IoT) appliance, and/or the like.

The database 135 may store one or more input data and/or output data, as described herein. For example, the database 135 may store input samples, such as one or more input vectors, as the input data. The input vectors may be two-dimensional vectors, or have a greater number of dimensions. The input samples may include one or more input features, which may be included in the one or more input vectors. Each input vector of the plurality of input vectors may contain one or more values corresponding to the one or more input features. The values corresponding to the one or more input features may be used (e.g., by the pairwise interaction engine 110) to classify the input samples into one or more bins. For example, the pairwise interaction engine 110 may classify the input samples based on the one or more values using a binary classification, such as a likely positive outcome (e.g., no disease or tumor, no fraud, etc.) or a likely negative outcome (e.g., likely existence of a disease or tumor, likely existence of fraud, etc.).

In some implementations, each of the dimensions of the vector corresponds to a predictor (also referred to herein as a "variable"). For example, the one or more input features may be or correspond to one or more predictors, such as a first predictor, a second predictor, a third predictor, and/or the like. The one or more predictors may contribute to the outcome of the first machine learning model 120, the second machine learning model 125, and/or another model (e.g., machine learning model) trained based on the input samples. The pairwise interaction engine 110 may determine the marginal contribution of these predictors based on, for example, the strength of the interaction effect between at least pairs of the predictors.

The one or more input samples may be associated with a transaction and/or a user corresponding to the transaction. The one or more input features may include transaction records, transaction types, information associated with transaction records such as a time, date, or location, user information associated with a user performing a transaction, and/or the like. For example, the one or more input features may include may be real world and/or historical data collected based on transactions made by one or more entities. In some implementations, the one or more input features stored in the database 135 may include a customer, an account, a person, a credit card, a bank account, or any other entity whose behavior is being monitored and/or is otherwise of interest, and/or the like, a plurality of transactions (e.g., purchases, sales, transfers, and/or the like), a class (e.g., a credit default, a fraudulent card transaction, a money laundering transaction, and/or the like) assigned to each of the plurality of transactions, an entity associated with each of the plurality of transactions, a time point associated with each of the plurality of transactions, and/or the like. Additionally and/or alternatively, the one or more input features correspond to one or more user behaviors, such as a propensity to engage in risky behavior, a frequency the user travels, a quantity of visits to a physician within a period of time, a quantity of surgeries within a period of time, a quantity and/or type of medical issue experienced by the user, a quantity of medications used by the user, a type of medication used by the user, a credit score, a quantity of accounts opened within a period of time, a frequency of accounts opened within a period of time, and/or the like.

The pairwise interaction engine 110 includes at least one data processor and at least one memory storing instructions, which when executed by the at least one data processor, perform one or more operations as described herein. The pairwise interaction engine 110 may include a machine learning engine. The pairwise interaction engine 110 may train the first machine learning model 120 based on input samples to generate a first outcome (e.g., a score, a classification, and/or the like). Additionally and/or alternatively, the pairwise interaction engine 110 may train the second machine learning model 125 based on the input samples to generate a second outcome (e.g., a score, a classification, and/or the like). The first machine learning model 120 and/or the second machine learning model 125 may include a neural network, a scorecard model, a generalized additive model (GAM), and/or the like. Training the first and second machine learning models 120, 125 is described in more detail below.

Additionally and/or alternatively, the pairwise interaction engine 110 may generate a visualization representing the strength of interaction effects between a plurality of predictors (e.g., a plurality of pairs of predictors). The visualization includes at least one of a graph, a heat map, a tabulation, and a matrix. In some implementations, the visualization includes a ranking of strength of the plurality of interaction effects. The pairwise interaction engine 110 may cause the visualization to be displayed at the client device 130.

Figure 2:
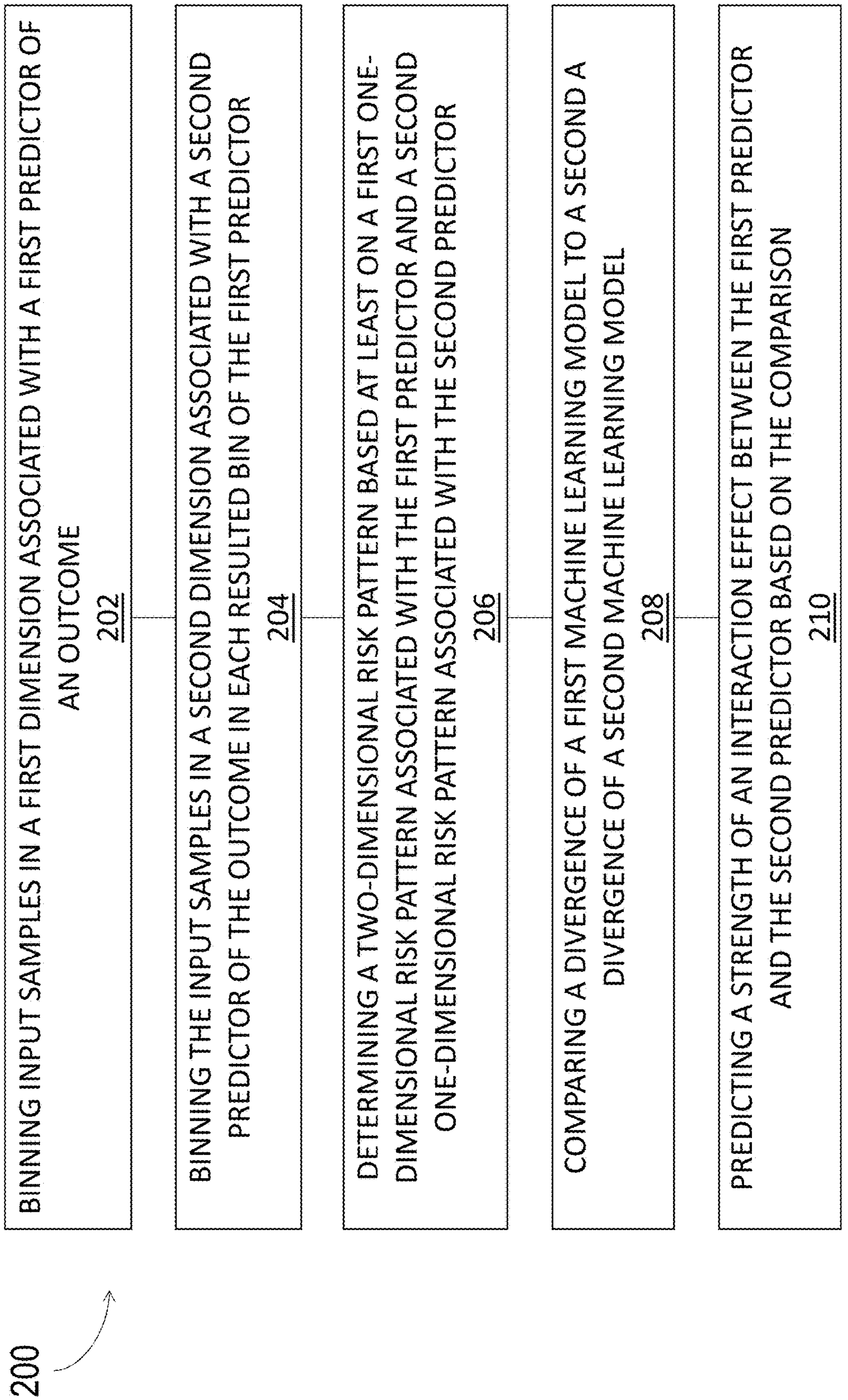
FIG. 2 depicts an example process for detecting pairwise interactions, consistent with implementations of the current subject matter.

FIG. 2 illustrates an example process 200 for implementing the pairwise interaction detection tool 100 to predict a strength of a pairwise interaction between at least two predictors, consistent with implementations of the current subject matter. The process 200 may be implemented by the pairwise interaction engine 110, and/or the like.

In some implementations, the pairwise interaction engine 110 may perform two-dimensional (also referred herein as "two-way") binning. For example, the pairwise interaction engine 110 may perform two-dimensional binning to group the input samples into one or more bins. The pairwise interaction engine 110 bins the input samples using two-dimensional binning to help determine the interaction between at least a pair of predictors.

Generally, there are several challenges in applying two-dimensional binning. For example, when applying multi-dimensional binning, it can be easy to run out of input samples if simply crossing one-dimensional bins, which may result in non-robust model fitting. As the order of interactions between predictors increases, the number of bins can grow exponentially. Thus, there may be insufficient input samples to satisfy minimum count requirements for all of the multi-dimensional bins. Further, applying multi-dimensional binning can result in unexplainable fitted results for cross-effect interactions between predictors if pattern constraints are not appropriately applied to the determination of scores using values associated with the predictors. For example, when applying multi-dimensional binning to input samples used to train a machine learning model to predict a score, without properly constraining the model, the pattern of fitted weights often contradict the observed weight-of-evidence pattern, which results in an unexplainable model.

The pairwise interaction engine 110 helps to address such challenges. For example, to overcome the low-count issue, the pairwise interaction engine 110 implements a count-driven re-binning based on the predictors to ensure adequate samples at each two-dimensional bin. To construct two-dimensional binning for a given pair of predictors, the pairwise interaction engine 110 (e.g., automatically and/or via a user selection) assigns one predictor in the pair of predictors as a primary predictor and the other as a secondary predictor. The secondary predictor serves as a segmentor, which defines bins (or segments) for the primary predictor and ensures the size of each segment meets the minimum count requirement that can be defined by users. The binning on the secondary predictor tends to be coarse and ensure input sample adequacy of each segment for further binning along the other dimension corresponding to the primary predictor. The primary predictor is intended to be binned more finely with lower minimum count requirements, which maintains a higher resolution.

As an example, the pairwise interaction engine 110 begins the two-dimensional binning. For example, at 202, the pairwise interaction engine 110 bins input samples in a first dimension associated with a first predictor of an outcome based at least on a sample minimum. Thus, the pairwise interaction engine 110 bins the input samples in the first dimension into one or more bins or segments that are separated by bin breaks. In other words, the pairwise interaction engine 110 conducts count-driven coarse binning of the input samples in the first dimension associated with the first predictor to determine bins or segments of the input samples along the first dimension that are separated by bin breaks. The pairwise interaction engine 110 may thus ensure that each bin containing non-missing values meet the minimum count requirement. In this instance, the first predictor may be a secondary variable or predictor. In other implementations, the first predictor is the primary variable or predictor.

The minimum count requirement may correspond to the sample minimum. The sample minimum indicates a minimum quantity of samples associated with a corresponding label that are included in each bin in the first dimension. In some implementations, the minimum quantity corresponds to a minimum quantity of samples relating to a first label and a minimum quantity of samples relating to a second label. The label may indicate whether an input sample and/or one or more values included in the input sample relate to a likely positive outcome (e.g., no disease or tumor, no fraud, etc.) or a likely negative outcome (e.g., likely existence of a disease or tumor, likely existence of fraud, etc.). The pairwise interaction engine 110 bins the input samples in the first dimension such that each bin in the first dimension includes a quantity of samples associated with the corresponding label (e.g., the positive or negative outcome) that meets (e.g., is greater than or equal to) the minimum quantity. As a result, each bin in the first dimension may include at least the minimum quantity of samples that include values related to a first outcome (e.g., a likely positive outcome) and the minimum quantity of samples that include values related to a likely second outcome (e.g., a likely negative outcome).

In some implementations, an input sample has a missing value and/or a specially-classified value. The missing value may correspond to an input sample with a value missing within the input vector. The specially-classified value may be a value that does not have continuity with non-special numeric values, such as zero or other numeric value. For example, the specially-classified value may be an overly negative value that does not align with the remaining values in the input samples. The pairwise interaction engine 110 may bin the input samples having the missing value and/or the specially-classified value in a separate bin. The separate bin may be separate from the first dimension and/or the second dimension. In other words, the separate bin may not be positioned along the dimensions associated with the predictors. The minimum count requirement may not apply to the separate bin containing the input samples having missing values and/or specially-classified values.

At 204, the pairwise interaction engine 110 bins the input samples in a second dimension associated with a second predictor of the outcome. In some implementations, the second dimension may be perpendicular to the first dimension. The pairwise interaction engine 110 may bin the input samples in the second dimension based at least on binning the input samples in the first dimension. For example, the pairwise interaction engine 110 bins the input samples in the second dimension according to the bin breaks separating each bin determined during binning the input samples in the first dimension (e.g., at 202). In other words, the pairwise interaction engine 110 may bin the input samples along the second dimension such that the bin breaks along the second dimension are consistent across all non-missing values and/or non-specially-classified value bins of the first predictor along the first dimension. In this instance, the second predictor may be a primary variable or predictor. In other implementations, the second predictor is the secondary variable or predictor.

While the bins along the second dimension are set to be consistent with the bins created along the first dimension, the input samples including missing values and/or specially-classified values can be binned differently in the first dimension from the second dimension. Thus, the pairwise interaction engine 110 creates a set of unified bin breaks of the second predictor for non-missing value bins of the first predictor.

In some implementations, the pairwise interaction engine 110 applies the minimum count when binning the input samples in the second dimension. In some implementations, the minimum count applied when binning the input samples in the second dimension is different from the minimum count applied when binning the input samples in the first dimension.

FIG. 3 illustrates an example table 300 showing two-dimensional binning, consistent with implementations of the current subject matter. In the example table 300, the first predictor is indicated as X2, which is a secondary predictor, and is shown as extending along a first dimension. The second predictor is indicated as X1, which is a primary predictor, and is shown as extending along a second dimension.

As shown in FIG. 3, the input samples are first binned in a first dimension associated with the first predictor X2 into the following bins: [–,1), [1,3), [3,9), and [9,+). Thus, the input samples are binned coarsely along the first dimension. As shown, the input samples have been binning in the first dimension along X2 such that each bin in the first dimension includes a quantity of input samples that meets a minimum count. In the example shown in FIG. 3, this means that the quantity of samples related to likely positive outcomes (e.g., good samples represented as $G_i$) and the quantity of samples related to likely negative outcomes (e.g., bad samples represented as $B_i$) meets the minimum count in each bin along X2.

Again referring to the example shown in FIG. 3, the pairwise interaction engine 110 then bins the input samples in a second dimension associated with a second predictor X1 into the following bins: [–,1), [1,2), [2,3), [3,6), [6,9), [9,12), [12,18), [18,24), and so on. Thus, the input samples are binned finely along the second dimension. The input samples may be binning along the second dimension X1 such that the bin breaks separating the bins are consistent across non-missing and/or non-specially-classified value bins created when binning the input samples along the first dimension X2. Accordingly, the pairwise interaction engine 110 bins using two-dimensional binning that ensures an adequate quantity of samples in each bin and in a manner that provides explainable results.

At 206, the pairwise interaction engine 110 determines a two-dimensional risk pattern based at least on a first one-dimensional risk pattern associated with the first predictor along the first dimension and a second one-dimensional risk pattern associated with the second predictor along the second dimension. The first one-dimensional risk pattern associated with the first predictor along the first dimension represents the risk patterns for each bin along the first dimension. The second one-dimensional risk pattern associated with the second predictor along the second dimension represents the risk patterns for each bin along the second dimension. The two-dimensional risk pattern includes the first one-dimensional risk pattern and the second one-dimensional risk pattern of a bin at an intersection between the first predictor and the second predictor.

As described herein, the first one-dimensional risk pattern and/or the second one-dimensional risk pattern includes at least one of increasing, decreasing, concave, and convex, although other patterns may be included. The one-dimensional risk pattern indicates an overall pattern for bins associated with one predictor along the dimension associated with the other predictor. As an example, the one-dimensional risk pattern for bins associated with the first predictor is the overall risk pattern for the first bins created along the second dimension. Thus, the increasing risk pattern represents a one-dimensional risk pattern of increasing for the bins associated with the first predictor along the second dimension (and vice versa). The decreasing risk pattern represents a one-dimensional risk pattern of decreasing for the bins associated with the first predictor along the second dimension (and vice versa). The concave risk pattern represents a one-dimensional risk pattern of increasing followed by decreasing for the bins associated with the first predictor along the second dimension (and vice versa). The convex risk pattern represents a one-dimensional risk pattern of decreasing followed by increasing for the bins associated with the first predictor along the second dimension (and vice versa).

The pairwise interaction engine 110 determines the two-dimensional risk pattern to help provide explainable results. For example, the pairwise interaction engine 110 determines the one-dimensional risk pattern along each dimension across the determined two-dimensional bins during binning the input samples along the first dimension and/or the second dimension. As described in more detail below, the pairwise interaction engine 110 applies the two-dimensional risk pattern as a constraint when optimizing scorecard model parameters.

FIGS. 4 and 5 illustrate an example of determining the two-dimensional pattern, based on the bins created and shown in FIG. 3, consistent with implementations of the current subject matter. For example, FIG. 4 depicts an example table 400 showing pattern detection along the first dimension X2 and FIG. 5 depicts an example table 500 showing pattern detection along the second dimension X1.

Referring to the table 400 in FIG. 4, the pairwise interaction engine 110 detects the overall one-dimensional risk pattern or constraint of the predictor X1 for each bin (or segment) in the first dimension X2. The pairwise interaction engine 110 (e.g., automatically) determines the one-dimensional risk pattern of the predictor X1 for each bin of the predictor X2, which will search for the optimal subset of the input bin breaks of the predictor X1 that can produce at least one of the following patterns: increasing, decreasing, concave, and convex. It should be appreciated that other patterns may be included and/or less than the illustrated patterns may be included. In some implementations, the pattern detection only applies to non-missing and non-specially-classified values of the input samples for the second predictor X1 and missing (or specially-classified) values are not considered in the pattern search.

As shown in the table 400, each two-dimensional bin has been assigned a pattern or constraint with all of its adjacent bins in each of two dimensions using “<” denoting increasing and “>” denoting decreasing. After determining the pattern or constraint of each pair of adjacent bins of the predictor X1, the pairwise interaction engine 110 determines the overall pattern or constraint of the predictor X1 for each bin in the first dimension X2. As an example, the pattern sequence of all adjacent bin pairs in the second dimension X1 for the bin or segment [–,1) in the first dimension X2 is shown as [>, >, >, <, <, >, < . . . ]. Based on the overall pattern decreasing before increasing, the pairwise interaction engine 110 assigns the overall pattern constraint of the predictor X1 for the bin [–,1) in the first dimension X2 as convex. As another example, the pattern of the predictor X1 for the bin [9,+) in the first dimension X2 is shown as [<, <, <, . . . , <]. Thus, the pairwise interaction engine 110 assigns the overall pattern constraint of the predictor X1 for the bin [9,+) in the first dimension X2 as increasing.

Referring to the table 500 in FIG. 5, the pairwise interaction engine 110 detects the overall one-dimensional pattern or constraint of the predictor X2 for each bin in the second dimension X1. The pairwise interaction engine 110 (e.g., automatically) determines the one-dimensional risk pattern of the predictor X2 for each bin of the predictor X1, which will search for the optimal subset of the input bin breaks of the predictor X2 that can produce at least one of the following patterns: increasing, decreasing, concave, and convex. It should be appreciated that other patterns may be included and/or less than the illustrated patterns may be included. In some implementations, the pattern detection only applies to non-missing and non-specially-classified values of the input samples for the predictor X2 and missing or specially-classified values are not considered in the pattern search.

As shown in the table 500, each two-dimensional bin has been assigned a pattern or constraint with all of its adjacent bins in each of two dimensions using “<” denoting increasing and “>” denoting decreasing. After determining the pattern or constraint of each pair of adjacent bins of the predictor X2, the pairwise interaction engine 110 determines the overall pattern or constraint of the predictor X2 for each bin in the second dimension X1. As an example, the pattern sequence of all adjacent bin pairs in the first dimension X2 for the bin [–, 1) in the second dimension X1 is shown as [ˆ, v, v]. Based on the overall pattern increasing before decreasing, the pairwise interaction engine 110 assigns the overall pattern constraint of the predictor X2 for the bin [–, 1) in the second dimension X1 as concave. As another example, the pattern sequence of all adjacent bin pairs in the first dimension X2 for the bin [12, 18) in the second dimension X1 is shown as [v, v, v]. Thus, the pairwise interaction engine 110 assigns the overall pattern constraint of the predictor X2 for the bin [12,18) in the second dimension X1 as decreasing.

In this example, the two-dimensional risk pattern determined by the pairwise interaction engine 110 represents the two determined one-dimensional risk patterns of a bin at an intersection between the first predictor and the second predictor. Additionally and/or alternatively, the two-dimensional risk pattern determined by the pairwise interaction engine 110 represents the overall risk patterns determined for each bin of one dimension in each segment of the other dimension. In the example shown in FIG. 5, the two-dimensional risk patterns includes [convex, convex, increasing, increasing, increasing] along the first dimension X2 and [concave, decreasing, . . . , decreasing] along the second dimension X1. Thus, the two-dimensional risk pattern incorporates the risk pattern along both dimensions for a given bin.

Referring again to FIG. 2, at 208, the pairwise interaction engine 110 compares the divergence of a first machine learning model (e.g., the first machine learning model 120) to the divergence of a second machine learning model (e.g., the second machine learning model 125). Divergence is a number to measure model performance for binary classification problems, which can quantify how much the model can separate out two label groups of outcomes (e.g. likely positive outcomes vs likely negative outcomes). The difference in divergence between the first machine learning model 120 and the second machine learning model 125 represents a strength of the interaction effect of predictor pairs.

In some implementations, the first machine learning model 120 and the second machine learning model 125 are built in sequence. For example, the first machine learning model 120 may be trained prior to training the second machine learning model 125 (or vice versa). In other implementations, the first and second machine learning models 120, 125 are trained in parallel or in any order.

The first machine learning model 120 is intended to capture only the main effects of the predictors (e.g., the first predictor, the second predictor, etc.). The first machine learning model 120 may be trained to generate a first output (e.g., a first score, etc.) based at least on the first predictor, the first one-dimensional risk pattern associated with the first predictor, the second predictor, the second one-dimensional risk pattern associated with the second predictor, and/or a baseline score generated based on the input samples. The baseline score may be pre-determined, such as by another model (e.g., another scorecard or machine learning model). The pairwise interaction engine 110 may apply the first one-dimensional risk pattern and the second one-dimensional risk pattern as separate constraints on the first machine learning model 120.

The first machine learning model 120 may thus generally include three terms corresponding to the baseline score and two predictors (denoted by X1 and X2) as standalone components. The first machine learning model 120 may be represented by the following equation:

$$f_1(S_{step1}, X_1, X_2) = \beta_0 \times S_{step1} + \sum_{i=1}^{P_{X_1}} \beta_i^{X_1} \times I(B_i^{X_1}) + \sum_{i=1}^{P_{X_2}} \beta_i^{X_2} \times I(B_i^{X_2}) \quad \text{Equation 1}$$

where $$B_i^{X_j}$$

represents the $i_{th}$ bin of $X_j$ and the one-way pattern constraints of X1 and X2 are applied individually.

FIG. 6A illustrates an example visualization 600, shown as a main-effect scorecard, consistent with implementations of the current subject matter. The visualization 600 shows the main effects associated with the predictors 601 individually. In this example, the predictors 601 include three predictors denoted by X1, X2, and X3 The visualization 600 further shows the one-dimensional risk patterns 602 associated with each of the predictors 601. In this case, the one-dimensional risk patterns 602 for each of the predictors 601 is increasing. The visualization 600 also shows the marginal contributions of each predictor 601 during training and validation of the first machine learning model 120. However, such results alone still can be improved by accounting for pairwise interaction effects among three predictors.

The second machine learning model 125 is intended to capture the pairwise interaction effects of the predictors (e.g., the first predictor, the second predictor, etc.). The second machine learning model 125 may be trained to generate a second output (e.g., a second score, etc.) based at least on all the terms and constraints in the first scorecard model 120 and a cross-effect term with the two-dimensional pattern constraints. The pairwise interaction engine 110 may apply both the one-dimensional pattern constraints to the two main-effect terms and the two-dimensional pattern constraint to the cross-effect term in the second machine learning model 125.

The second machine learning model 125 may generally include both the main-effect and cross-effect terms of the predictor pairs (or other combinations). Thus, the second machine learning model 125 includes an additional cross-effect term relative to the first machine learning model 120 representing the cross-effect interaction between the first predictor and the second predictor and so on. The second machine learning model 125 may be represented by the following equation:

$$f_2(S_{step1}, X_1, X_2) = f_1(S_{step1}, X_1, X_2) + \sum_{j=1}^{C_{X_2}} \sum_{i=1}^{C_{X_1}^j} \beta_{i,j}^{X_1X_2} \times I(B_{i,j}^{X_1X_2}) \quad \text{Equation 2}$$

where $$B_{i,j}^{X_1X_2}$$

represents the ($i_{th}$, $j_{th}$) bin of the two-way binning matrix by $X_1$ and $X_2$ and is applied as a cross-term including the two-dimensional risk pattern (e.g., the two-dimensional risk pattern determined at 206 in FIG. 2).

FIG. 6B illustrates an example visualization 605, shown as a cross-effect scorecard, consistent with implementations of the current subject matter. The visualization 605 shows the marginal contribution of the pairwise interaction effects among three predictors (a first predictor X1, a second predictor X2, and a third predictor X3 shown in the main effect scorecard of FIG. 6A). Here, the marginal contribution shows the strength of the pairwise interaction effects between pairs of the predictors. For example, in visualization 605, the marginal contribution of the pairwise interaction effects between pairs of predictors over the training samples is shown at 607 and the marginal contribution of the pairwise interaction effects between pairs of predictors over the validation samples is shown at 609.

Referring again to FIG. 2, at 210, the pairwise interaction engine 110 may predict a strength of an interaction effect between the first predictor and the second predictor based on the comparison (e.g., at 208). The strength of the interaction effect indicates a marginal contribution of the interaction between the first predictor and the second predictor to at least the first output (e.g., of the second machine learning model 125). In some implementations, the marginal contribution of the interaction effect between the pairs of predictors is measured as the difference between the divergence of the second machine learning model 125 and the divergence of the first machine learning model 120. The marginal contribution of the interaction effect can be represented by the following equation:

$$\text{Divergence (second model)} - \text{Divergence (first model)} \quad \text{Equation 3}$$

The pairwise interaction engine 110 can rank the pairs of predictors based on the marginal contribution of the pairwise interaction effects in descending order to provide pairs of predictors that may contribute more to a particular outcome (e.g., score). This improves the predictability of the machine learning model 120 and allows for a better understanding of how the pairwise cross effects of predictors impact the model 120.

In some implementations, the pairwise interaction engine 110 generates a visualization that includes or otherwise indicates the strength of interaction effects between a plurality of predictors (e.g., a plurality of pairs of predictors). The visualization includes at least one of a graph, a heat map, a tabulation, and a matrix. The visualization may include a pattern, a color, or other indicator to represent the strength of the pairwise interaction effect. In some implementations, the visualization includes a ranking of strength of the plurality of interaction effects. The pairwise interaction engine 110 may cause the visualization to be displayed at the client device 130.

FIGS. 6C-6F illustrate various example visualizations generated by the pairwise interaction engine 110, consistent with implementations of the current subject matter. For example, FIG. 6C illustrates an example summary matrix 610 of marginal contributions between a pairs of a plurality of secondary predictors X2 and a plurality of primary predictors X1. FIG. 6D illustrates a table 620 depicting a predictor level breakdown of pairwise interaction effects 623 at each bin of a secondary predictor 622 (X2) for each primary predictor 621 (X1). The pairwise interaction effects 623 having a greater strength have been highlighted for clarity and to improve users' experience. FIG. 6E illustrates a table 630 depicting a bin level breakdown of pairwise interaction effects 634 for each particular two-dimensional bin 631 and for each pair of a secondary predictor 632 (X2) and a primary predictor 633 (X1). Further, FIG. 6F shows a heat map 640 depicting a strength of the interaction effects between pairs of predictors using colors and shades of the colors to depict the two-dimensional changing pattern of the effects.

Figure 7:
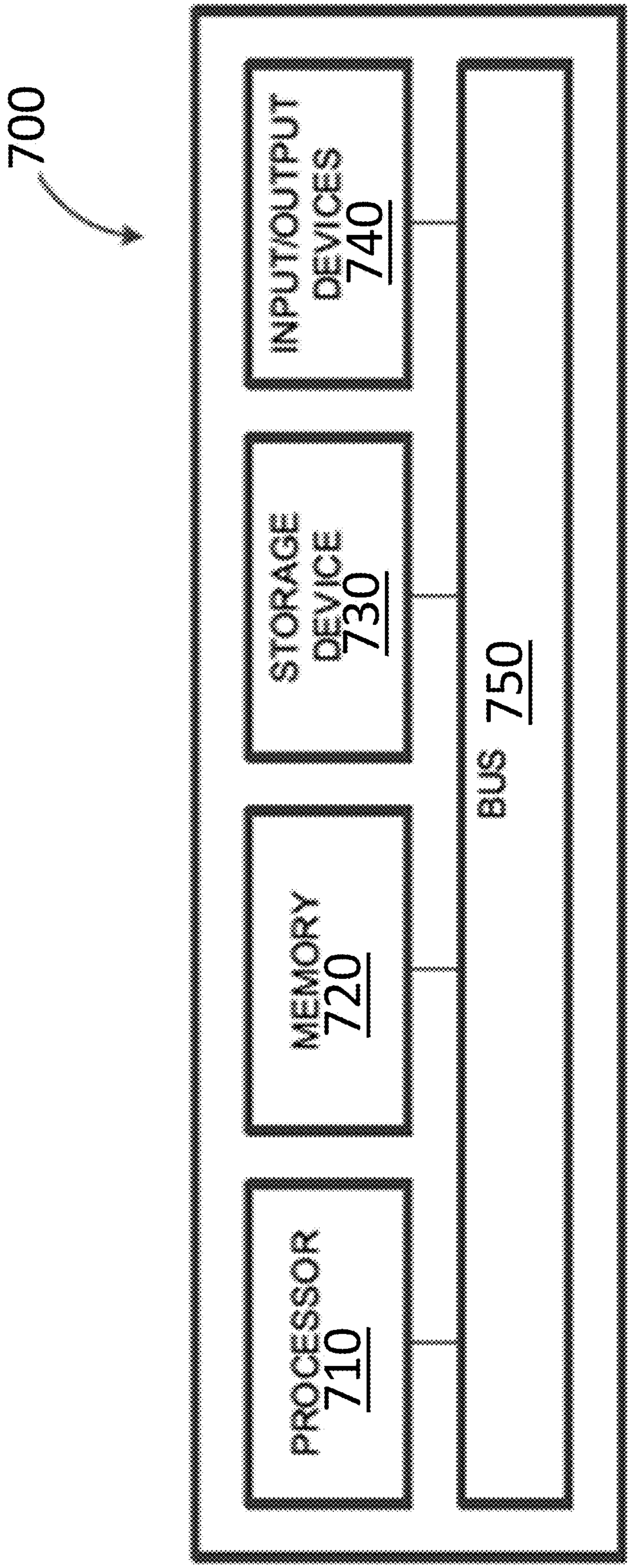
FIG. 7 depicts a block diagram illustrating an example of a computing system, consistent with implementations of the current subject matter.

FIG. 7 depicts a block diagram illustrating a computing system 700 consistent with implementations of the current subject matter. Referring to FIGS. 1-7, the computing system 700 can be used to implement the pairwise interaction detection system 100, the pairwise interaction engine 110, the first machine learning model 120, the second machine learning model 125, and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The computing system 700 may additionally or alternatively include a graphic processing unit (GPU), such as for image processing, and/or an associated memory for the GPU. The GPU and/or the associated memory for the GPU may be interconnected via the system bus 750 with the processor 710, the memory 720, the storage device 730, and the input/output devices 740. The memory associated with the GPU may store one or more images described herein, and the GPU may process one or more of the images described herein. The GPU may be coupled to and/or form a part of the processor 710. The processor 710 is capable of processing instructions for execution within the computing system 700. Such executed instructions can implement one or more components of, for example, the pairwise interaction detection system 100, the pairwise interaction engine 110, the first machine learning model 120, the second machine learning model 125, and/or the like. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented system comprising:

at least one data processor; and at least one memory storing instructions, which when executed by the at least one processor result in operations comprising:

binning input samples in a first dimension associated with a first predictor of an outcome based at least on a sample minimum, wherein the input samples in the first dimension are binned coarsely to promote input sample adequacy along a second dimension associated with a second predictor;

binning the input samples in the second dimension associated with a second predictor of the outcome based at least in part on the coarsely binned binning the input samples in the first dimension, wherein the input samples are binned less coarsely along the second dimension;

determining a two-dimensional risk pattern based at least on a first one-dimensional risk pattern associated with the first predictor along the first dimension and a second one-dimensional risk pattern associated with the second predictor along the second dimension;

comparing a first divergence of a first machine learning model to a second divergence of a second machine learning model, wherein the first machine learning model is trained to generate a first output based at least on the first predictor, the first one-dimensional risk pattern associated with the first predictor, the second predictor, the second one-dimensional risk pattern associated with the second predictor, and a baseline score generated based on the input samples, and wherein the second machine learning model is trained to generate a second output based at least on the baseline score and a cross-effect term including the two-dimensional risk pattern; and predicting strength of an interaction effect between the first predictor and the second predictor based on the comparison, wherein the strength of the interaction effect indicates a marginal contribution of the interaction effect between the first predictor and the second predictor to at least the second output.

2. The system of claim 1, wherein the operations further comprise:

generating a visualization representing a strength of a plurality of interaction effects between a plurality of predictors, wherein the strength of the plurality of interaction effects includes the strength of the interaction effect between the first predictor and the second predictor, and wherein the plurality of predictors includes the first predictor and the second predictor.

3. The system of claim 2, wherein the visualization includes at least one of a graph, a heat map, a tabulation, and a matrix.

4. The system of claim 2, wherein the visualization includes a ranking of strength of the plurality of interaction effects.

5. The system of claim 1, wherein the sample minimum indicates a minimum quantity of samples associated with a corresponding label that are included in each bin in the first dimension, and wherein the input samples are binned in the first dimension such that each bin in the first dimension includes a quantity of samples associated with the corresponding label that is greater than or equal to the minimum quantity.

6. The system of claim 5, wherein the input samples are binned in the second dimension according to bin breaks separating each bin determined during binning the input samples in the first dimension.

7. The system of claim 1, wherein the first one-dimensional risk pattern includes at least one of increasing, decreasing, concave, and convex, and wherein the second one-dimensional risk pattern includes at least one of increasing, decreasing, concave, and convex.

8. The system of claim 1, wherein the first one-dimensional risk pattern and the second one-dimensional risk pattern are applied as separate constraints on the first machine learning model, and wherein the two-dimensional risk pattern is applied as a single constraint on the second machine learning model.

9. The system of claim 1, wherein the two-dimensional risk pattern represents the first one-dimensional risk pattern and the second one-dimensional risk pattern of a bin at an intersection between the first predictor and the second predictor.

10. The system of claim 1, wherein the first machine learning model is at least one of a neural network, a generalized additive model, and a scorecard model, and wherein the second machine learning model is at least one of a neural network, a generalized additive model, and a scorecard model.

11. A computer-implemented method executed on a processor, the method comprising:

binning input samples in a first dimension associated with a first predictor of an outcome based at least on a sample minimum, wherein the input samples in the first dimension are binned coarsely to promote input sample adequacy along a second dimension associated with a second predictor;

binning the input samples in the second dimension based at least in part on the coarsely binned input samples in the first dimension, wherein the input samples are binned less coarsely along the second dimension;

determining a two-dimensional risk pattern based at least on a first one-dimensional risk pattern associated with the first predictor along the first dimension and a second one-dimensional risk pattern associated with the second predictor along the second dimension;

comparing a first divergence of a first machine learning model to a second divergence of a second machine learning model, wherein the first machine learning model is trained to generate a first output based at least on the first predictor, the first one-dimensional risk pattern associated with the first predictor, the second predictor, the second one-dimensional risk pattern associated with the second predictor, and a baseline score generated based on the input samples, and wherein the second machine learning model is trained to generate a second output based at least on the baseline score and a cross-effect term including the two-dimensional risk pattern; and predicting strength of an interaction effect between the first predictor and the second predictor based on the comparison, wherein the strength of the interaction effect indicates a marginal contribution of the interaction effect between the first predictor and the second predictor to at least the second output.

12. The method of claim 11, further comprising: generating a visualization representing a strength of a plurality of interaction effects between a plurality of predictors, wherein the strength of the plurality of interaction effects includes the strength of the interaction effect between the first predictor and the second predictor, and wherein the plurality of predictors includes the first predictor and the second predictor.

13. The method of claim 12, wherein the visualization includes at least one of a graph, a heat map, a tabulation, and a matrix.

14. The method of claim 12, wherein the visualization includes a ranking of strength of the plurality of interaction effects.

15. The method of claim 11, wherein the sample minimum indicates a minimum quantity of samples associated with a corresponding label that are included in each bin in the first dimension, and wherein the input samples are binned in the first dimension such that each bin in the first dimension includes a quantity of samples associated with the corresponding label that is greater than or equal to the minimum quantity.

16. The method of claim 15, wherein the input samples are binned in the second dimension according to bin breaks separating each bin determined during binning the input samples in the first dimension.

17. The method of claim 11, wherein the first one-dimensional risk pattern includes at least one of increasing, decreasing, concave, and convex, and wherein the second one-dimensional risk pattern includes at least one of increasing, decreasing, concave, and convex.

18. The method of claim 11, wherein the first one-dimensional risk pattern and the second one-dimensional risk pattern are applied as separate constraints on the first machine learning model, and wherein the two-dimensional risk pattern is applied as a single constraint on the second machine learning model.

19. The method of claim 11, wherein the two-dimensional risk pattern represents the first one-dimensional risk pattern and the second one-dimensional risk pattern of a bin at an intersection between the first predictor and the second predictor.

20. A non-transitory computer-readable medium storing instructions, which when executed by at least one data processor, result in operations comprising:

binning input samples in a first dimension associated with a first predictor of an outcome based at least on a sample minimum, wherein the input samples in the first dimension are binned coarsely to promote input sample adequacy along a second dimension associated with a second predictor;

binning the input samples in athe second dimension based at least in part on the coarsely binned input samples in the first dimension, wherein the input samples are binned less coarsely along the second dimension;

determining a two-dimensional risk pattern based at least on a first one-dimensional risk pattern associated with the first predictor along the first dimension and a second one-dimensional risk pattern associated with the second predictor along the second dimension;

comparing a first divergence of a first machine learning model to a second divergence of a second machine learning model, wherein the first machine learning model is trained to generate a first output based at least on the first predictor, the first one-dimensional risk pattern associated with the first predictor, the second predictor, the second one-dimensional risk pattern associated with the second predictor, and a baseline score generated based on the input samples, and wherein the second machine learning model is trained to generate a second output based at least on the baseline score and a cross-effect term including the two-dimensional risk pattern; and predicting strength of an interaction effect between the first predictor and the second predictor based on the comparison, wherein the strength of the interaction effect indicates a marginal contribution of the interaction effect between the first predictor and the second predictor to at least the second output.

* * * * *